Feb. 11, 1969

HUGH L. DRYDEN
DEPUTY ADMINISTRATOR OF THE NATIONAL
AERONAUTICS AND SPACE ADMINISTRATION
PNEUMATIC MIRROR SUPPORT SYSTEM 3,427,097

Filed Aug. 24, 1965

INVENTOR
KENNETH L. KEMP

BY

ATTORNEYS

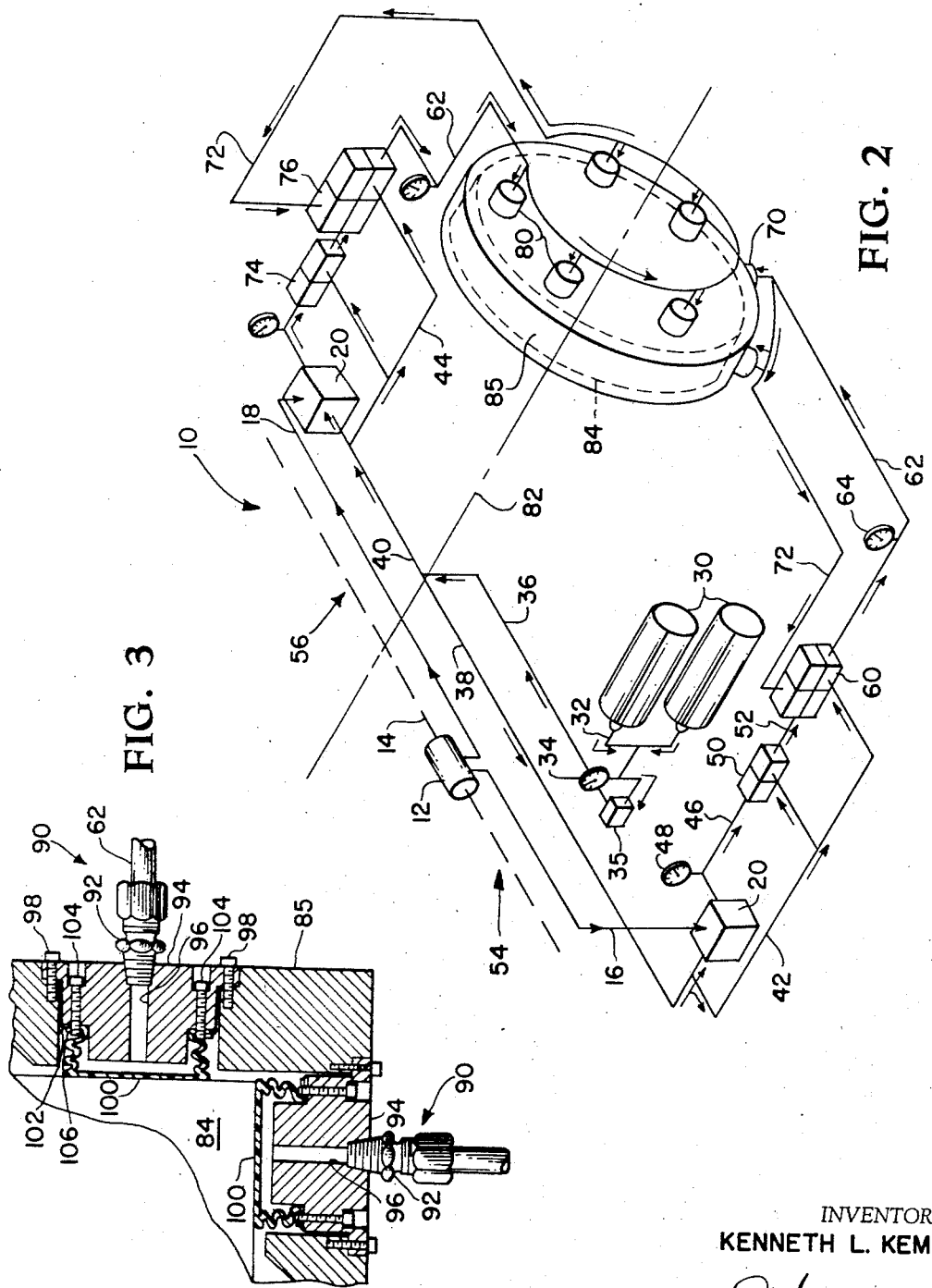

3,427,097
PNEUMATIC MIRROR SUPPORT SYSTEM
Hugh L. Dryden, Deputy Administrator of the National Aeronautics and Space Administration with respect to an invention of Kenneth L. Kemp, Glenshaw, Pa., assignor to the United States of America as represented by the Administrator of the National Aeronautics and Space Administration
Filed Aug. 24, 1965, Ser. No. 482,313
U.S. Cl. 350—310    4 Claims
Int. Cl. G02f 7/00

ABSTRACT OF THE DISCLOSURE

A mounting arrangement for a telescope mirror featuring pneumatic supports distributed about the rear and the circumference of the mirror together with a control system which varies the pressure in both sets of supports as a function of the elevation angle of the telescope.

---

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates generally to a pneumatic support and more particularly to a pneumatic support for the primary mirror of a telespectrograph.

The tracking telespectrograph is a precision optical instrument used to track the reentry flight of a space vehicle or satellite and record on film a continuous spectrum of its light output and supplementary sequential engineering data with respect to real time. The telespectrograph requires a primary mirror of monstrous proportions to those known a few years ago. This is also true of the mirror system of the well known telescopes which have taken on considerably greater dimensions in recent years in order to provide accurate visual study of distant objects such for example as other planets. Rigid support of the primary mirror and telespectrographs and/or telescopes presents considerable difficulties due to expansion and contraction caused by varying environments, inability to accurately position the mirror without considerable machining of heavy materials and a long period of breakdown time once the mirror is out of alinement or requires adjustment. It therefore becomes necessary to provide a support system for the primary mirror that will permit rapid and accurate positioning of the mirror without consequent damage to the mirror itself. Such a support system must necessarily support the weight of the mirror not only about its periphery or circumference, but must also support the mirror along its optical axis since the telespectrograph may be elevated from the horizontal to approximately 90° or the vertical.

Prior methods of supporting the primary mirror of telescopes or telespectrographs have utilized rigid supports about the circumference and at the rear of the mirror. However, such systems require an extremely strong mirror in order to prevent the support from detracting from the ability of the mirror to function as desired. A rigid support for the primary mirror may result in scratches due to even minimal variations in the atmospheric environment and, accordingly, possible destruction of the mirror. The use of resilient or cushioned supports again fail to provide the accurate positioning required of such a system. Further, the rigid support of a primary mirror for a telespectrograph requires extremely accurate machining of the support which involves a considerable number of man-hours for the machining as well as subsequent assembly of the mirror in its support.

In order to overcome the disadvantages of the prior art, the instant invention contemplates the use of a pneumatic pressure control system for supporting the primary mirror by utilizing pneumatic bellows in which the pressure is controlled by the elevation angle of the optical axis of the telespectrograph. A sensing device connected with axial and radial pneumatic pressure supplies determines the elevation angle of the optical axis and proportionately provides pneumatic pressure to support members.

It is an object of the instant invention to provide an electronically controlled pressure support system for a movable object.

Still another object of this invention is to provide a pneumatic pressure control system for the primary mirror of a telespectrograph that permits accurate positioning of the mirror and complete support thereof dependent upon the elevation angle of the optical axis.

A further object of the instant invention is to provide a control system which senses the elevation angle and conveys an electrical signal dependent thereon to an electro-pneumatic converter to establish a pneumatic pressure dependent upon the elevation angle to pressure bellows which support the primary mirror.

Another object of this invention is to provide a method of supporting the primary mirror of a telespectrograph at a desired elevation angle by electrically sensing that angle and converting the electrical signal to pneumatic pressure that is applied to support the primary mirror.

Generally, the foregoing and other objects are accomplished by utilizing a sine-cosine potentiometer for determining the elevation angle of the optical axis and conveying a signal to an electro-pneumatic converter which has a pneumatic pressure output that sequentially enters a two-chamber ratio totalizer and a four-chamber ratio totalizer that control the pneumatic pressure applied to the bellows support members and reference that pressure by the incoming supply pressure and the feedback pressure from the bellows support members.

A more complete appreciation of the invention and many of the attendant advantages thereof will be readily apparent as the same becomes better understood by reference to the following description when considered in connection with the accompanying drawings wherein:

FIG. 2 is a schematic view of the pressure control system of the instant invention; and FIG. 3 is a sectional view of two of the support members of the instant invention.

Figure 1:
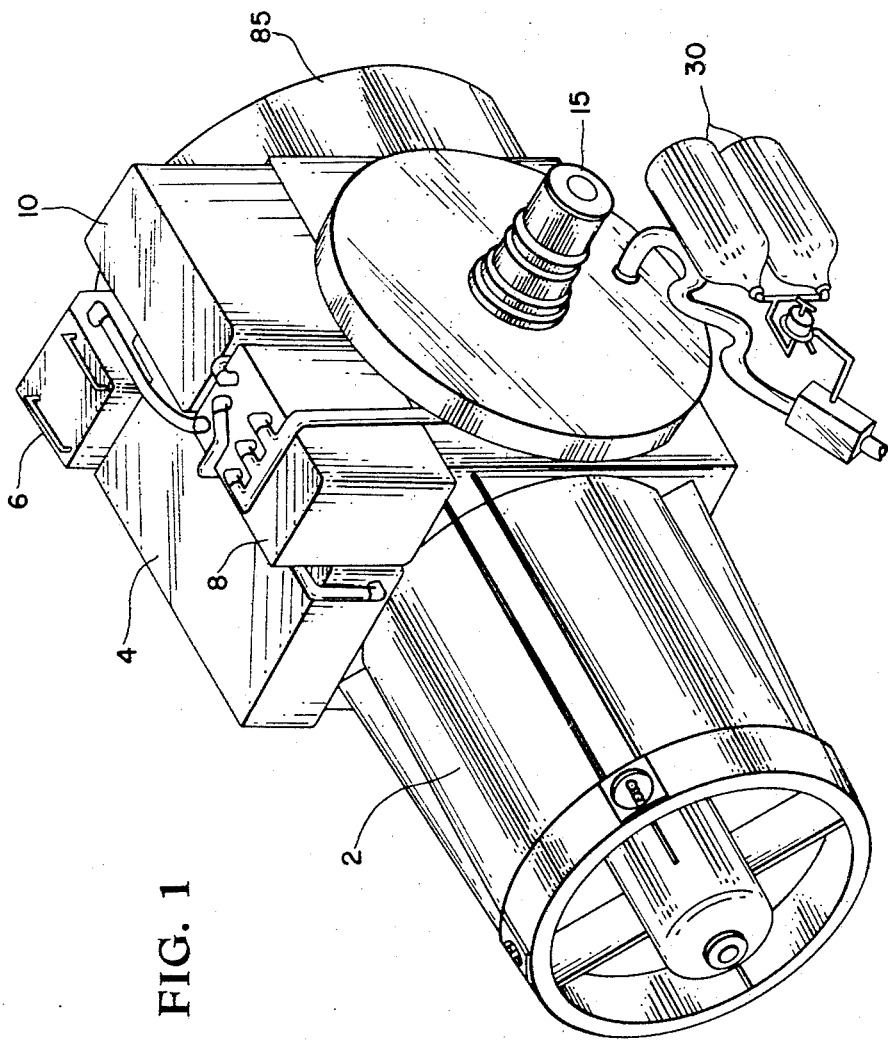
FIG. 1 is a telespectrograph incorporating the instant invention.

Referring now to the drawing and more particularly to FIG. 1 wherein one embodiment of the instant control system, generally designated by reference numeral 10, is shown mounted on a telespectrograph which includes telescope assembly 2 and spectrograph assembly 4 in conjunction with camera 6 and servo electronics assembly 8. Control system 10, FIG. 2, includes sine-cosine potentiometer 12 mounted about tilt axis 14 of trunnion 15, FIG. 1, to sense the elevation angle as will be more fully described hereinafter. Electrical leads 16 and 18 extend from potentiometer 12 to cosine subsystem 54 and sine subsystem 56, respectively, where they are connected to electro-pneumatic converters 20. Pneumatic pressure supply 30, such for example as air tanks, is connected to each of the subsystem pneumatic converters 20 by connector line 32 that reduces to a single pressure supply line 36 having pressure gage 34 to monitor the pressure coming from supply 30. Main pneumatic line 36 divides into cosine supply line 38 and sine supply line 40 which respectively extend to provide pressure to electro-pneumatic converters 20 as well as connecting to bypass pressure lines 42 and 44, respectively. Electro-pneumatic converters 20 function to utilize the electrical signal supplied by potentiometer 12 to regulate a pneumatic pressure which is exhausted into outlet line 46 having pressure gage 48 for monitoring the outlet pressure.

Sine and cosine subsystems 56 and 54 are substantially identical and a description of cosine subsystem 54 will serve as well for sine subsystem 56 except for the point of application of the support as will be described more fully hereinafter. Thus, outlet line 46 extends from converter 20 to two-chamber ratio totalizer 50 which utilizes the pressure in bypass pressure line 42 as a reference for comparison with the outlet pressure from converter 20 in establishing an outlet pressure from totalizer 50 into conduit 52. Totalizer 50 is of well known construction and utilizes a pneumatic system to provide a multiplier effect in fractional form to reduce the pressure from converter 20 into conduit 52. The specific system shown schematically herein provides a variable pressure from converter 20 of 0 to 15 p.s.i.g. in line 46 that enters totalizer 50 where it is multiplied by the fraction one-third to exhaust an outlet pressure in conduit 52 of 0 to 5 p.s.i.g. Four-chamber totalizer 60 is connected with totalizer 50 by conduit 52 to act therewith in providing fluid at the correct pressure to the support elements. Therefore, totalizer 60 has an inlet pressure of 0 to 5 p.s.i.g. and a second inlet from bypass conduit 42 of 24 p.s.i.g. and another inlet from feedback line 72 as will be described more fully hereinafter. Totalizer 60 utilizes a 1 to .85 ratio and thereby exhausts a pressure varying from 0 to 4.25 p.s.i.g. into conduit 62, which pressure is monitored and read by pressure gage 64.

Pressure line 62 extends and is connected to radial support cylinders or fluid motors 70, which are controlled by cosine subsystem 54. There are a total of twelve radial support cylinders 70 mounted in mirror cell 85 and equally spaced about the periphery of primary mirror 84 to function as the support members for the radial weight of mirror 84. Radial support cylinders 70 are connected with feedback line 72 which provides one of the input pressures into four-chamber totalizer 60.

Sine subsystem 56 functions identically to cosine subsystem 54 and utilizes substantially identical elements with the exception that two-chamber totalizer 74 multiplies by the fraction one-half and, therefore, the variable pressure of 0 to 15 p.s.i.g. entering totalizer 74 is exhausted as an output varying from 0 to 7.5 p.s.i.g. That pressure enters four-chamber totalizer 76 which also has three inputs and utilizes a fraction ratio of 1 to .93 to provide a variable output of 0 to 7 p.s.i.g. The output pressure from totalizer 76 is fed to axial support members 80 mounted in mirror cell 85 for support of mirror 84 along optical axis 82. Although FIG. 2 shows a relatively few support cylinders 70 and 80, one embodiment of the instant invention which has been constructed, utilized twelve radial supports 70 and eighteen axial supports 80 for accurate positioning of mirror 84.

Radial support cylinders 70 and axial support cylinders 80 are substantially identical and are shown in FIG. 3 generally at 90. Support cylinders 90 utilize nozzle elements 92 which are connected to supply lines 62 extending from the four-chamber totalizer in each of the cosine and sine subsystems 54 and 56. Cylinder block 94 has a central bore 96 extending therethrough and which is mounted in communication with nozzle 92. Block 94 is mounted on mirror cell 85 of the telespectrograph by bolts 98. Bellows seal 100 has a flat portion in contact with mirror 84 and a corrugated or bellows portion extending away from the mirror face to flange 102 which is secured to cylinder block 94 by bolts 104 and nuts 106. Thus, it is seen that as the pneumatic pressure is exhausted from the nozzle 92, it passes through bore 96 into the sealed portion of bellows 100 which are in contact with mirror 84 to provide the necessary support depending upon the pressure exhausted from nozzle 92.

OPERATION

The prime function of the pressure control system is to provide two air supply outputs to the mirror support manifolds. One of the outputs controls the axial air bellows located across the back of the primary cell and the other supply provides the pneumatic pressure for the radial bellows mounted about the circumference of the primary cell. The basic air supply is, in this specific example, a 100 p.s.i. pressure obtained from two storage tank accumulators 30 mounted on the telespectrograph. Sine-cosine potentiometer 12 is coupled with a ratio of one to one to the elevation trunnion axis of the telespectrograph and provides the controlling signals to cosine and sine pressure control subsystem 54 and 56, respectively. The sine function output of potentiometer 12 is fed to pressure control subsystem 56 for axial bellows support members 80 located across the back of mirror 84 and the cosine function output of potentiometer 12 controls the pneumatic supply for radial bellows supports 70 mounted about the circumference of mirror 84. At zero elevation angle, the sine voltage output is nine volts D.C. Conversely, with the elevation axis at zero degrees the cosine function output voltage is the maximum nine volts D.C. and at 90° elevation the cosine output voltage is one volt D.C.

Accumulator storage tanks 30 provide the 100 p.s.i. output at the beginning of each operation of the telespectrograph. This 100 p.s.i. output is fed through pressure regulator 35 and gage 34. Regulator 35 is set to provide a constant 24 p.s.i.g. output to pressure control subsystems 54 and 56. The 24 p.s.i.g. output is applied to electro-pneumatic converters 20 and, simultaneously, is applied to two-chamber totalizers 50 and 74 and to four-chamber totalizers 60 and 76. When optical axis 82 is at 90° elevation, the output of the cosine winding of potentiometer 12 is a one volt D.C. signal which is applied to converter 20 of cosine subsystem 54. At this voltage, the output pressure of converter 20 is zero p.s.i.g., however, as the elevation angle is decreased toward zero, the output voltage from the cosine winding of potentiometer 12 increases as a cosine function up to nine volts D.C. maximum. The output of converter 20 correspondingly increases linearly from 0 to 15 p.s.i.g. This pressure is the controlling pressure which is fed into the controlling chamber of two-chamber totalizer 50.

Cosine subsystem 54 has two-chamber totalizer 50 set up with a 3 to 1 ratio. That is, whatever the controlling pressure, the output will be equal to one-third of that pressure. Therefore, the maximum output pressure of two-chamber totalizer 50 is 5 p.s.i.

In a similar manner, the 0 to 5 p.s.i. pressure controls the output of four-chamber totalizer 60, which applies the fluid pressure directly to support cylinders 70. However, four-chamber totalizer 60 operates at a ratio of 1 to .85. That is, whatever the controlling input pressure, the output pressure will be equal to .85 times that input pressure. Therefore, the output pressure to support cylinders 70 will vary from 0 to 4.25 p.s.i.

The output pressure from four-chamber totalizer 60 is applied directly to the group of support cylinders 70 which are located about the lower circumference of primary mirror 84. At the end of supply line 62 the pressure within line 62 is applied through tubing 72 to the feedback chamber of totalizer 60. When the feedback pressure is equal to the output pressure applied to supports 70, the pneumatic pressure is stabilized to the bellows support members. Since the feedback pressure is one of the controls for the output pressure, a constant regulated air pressure is applied to circumferential bellows support members 70 depending upon the cosine function of the elevation angle.

In a similar manner the sine subsystem 56 functions to utilize the output of potentiometer 12 for control of the pneumatic pressure supply to axial bellows supports 80 located across the back of primary mirror 84. The output pressure of converter 20 in sine subsystem 56 varies linearly from 0 to 15 p.s.i. as the elevation increases from 0 to 90 degrees. The difference between sine subsystem 56 and cosine subsystem 54, described hereinabove, is that two-chamber totalizer 74 has a two-to-one ratio and thus provides a pressure varying from 0 to 7.5 p.s.i. which is supplied to the controlling chamber of four-chamber totalizer 76. Totalizer 76 operates at a ratio of 1 to .93, and the output pressure to bellows supports 80 about the rear of primary mirror 84 varies from 0 to 7 p.s.i.

The output pressure of four-chamber totalizers 60 and 76 is supplied to support members 70 and 80 by conduits 62. The fluid is exhausted through nozzle 92 and passes through bore 96 to establish a constant pressure on bellows seal 100. Since bellows seal 100 is in contact with the rear face of mirror 84, the pressure in line 62 is essentially applied on the mirror. Supply line 62 and feedback line 72 communicate with one another to provide equal pressure throughout the feedback loop.

The inputs and outputs of each of the totalizers are monitored by pressure gages such for example as 48 and 64 which are readily visible along the pressure control subassemblies 54 and 56. The outputs of the final four-chamber totalizers 60 and 76 are a 0 to 7 p.s.i. pressure which is applied directly to axial bellows support members 80 and a 0 to 4.5 p.s.i. pressure applied to circumferential or radial bellows support members 70. Feedback loops 72 connect to the input of totalizers 60 and 76 to provide a system for monitoring of the pneumatic pressure within the bellows support members and act in a manner similar to an electrical servo loop feedback.

Thus, it is seen that when the telescope or telespectrograph assembly is in a horizontal position the pneumatic supply to lower circumferential bellows supports 70 is fed a constant 4.25 p.s.i. pressure to maintain the radial positioning of mirror 84. As the telespectrograph is elevated toward 90°, the radial pressure is gradually reduced, varying with the cosine of the elevation angle, until it reaches zero pressure when the telespectrograph is at the 90° position. In this manner, a uniform pressure equal to the radial component of the weight of mirror 84 is maintained across the entire circumference of the primary mirror cell. As the telespectrograph is depressed toward the zero degree position, the pressure is gradually increased until the 4.25 p.s.i. pressure is applied to the lower circumferential bellows supports 70 when the spectrograph has reached the zero degree or horizontal elevation.

When telespectrograph is at zero degrees elevation, there is no pressure applied to the axial bellows supports 80 which support the back of mirror 84 because the axial component of the mirror weight is zero. However, as the telespectrograph is elevated toward the 90° position, the full 7 p.s.i. pressure is gradually applied across the rear of primary mirror 84. In this manner, constant pressure is applied and accurate positioning of mirror 84 is effected. As the telespectrograph depresses toward zero degrees elevation, the pressure is gradually decreased until it reaches zero pressure at zero degrees elevation.

The above description of the operation of the instant invention is just one specific example to give a clear indication of the full operability of the mirror support system which utilizes a pneumatic pressure control system. It is to be readily understood that the pressure applied to bellows support members 70 and 80 necessarily depends upon the weight of mirror 84 and the variation in elevation anticipated to be encountered. From the above example, it is apparent that the instant pneumatic control system provides a way of accurately positioning the primary mirror of the telespectrograph or telescope without requiring extensive machining or inconveniences that might be encountered in a fixed support-type system. The instant system functions automatically and requires a minimum of upkeep and merely an insurance of continued pneumatic supply. Although the example given herein suggests the use of air pressure for the source of pneumatic support, it is to be understood that any practical fluid may be utilized and, due to the closed system, may be set up for rapid and complete recovery.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. In a control system for a telespectrograph, the combination comprising:
   a primary mirror having an optical axis;
   means including a sine-cosine potentiometer for sensing the elevation angle of the optical axis about the tilt axis of the telespectrograph and producing an electrical signal in proportion to said elevation angle;
   leads for conveying said signal to each of a sine and cosine subsystem;
   each said subsystem including an electro-pneumatic converter in series with, firstly, a two-chamber totalizer and, secondly, a four-chamber totalizer;
   said subsystem components interconnected by a main pneumatic pressure supply line and a pneumatic pressure-ratio line;
   pneumatic supply to said converter;
   a plurality of bellows support members disposed about said primary mirror;
   said four-chamber totalizer having an outlet to provide a pneumatic supply to said support members;
   some of said bellows support members disposed about the periphery of said primary mirror to provide radial support therefor in accordance with the signal from said cosine electro-pneumatic converter;
   the remainder of said bellows support members disposed about the rear of said primary mirror to provide axial support therefor in accordance with the signal from said sine electro-pneumatic converter;
   pneumatic feedback lines connecting said bellows support members and said four-chamber totalizers to insure uniform pressure in each of said axial and radial bellows supports;
   said bellows support members having a nozzle element providing pneumatic supply through a bore in a support cylinder that communicates with the interior of a bellows seal;
   the exterior of said bellows seal contacting said primary mirror, whereby the electrical signal from said potentiometer activates and governs said electro-pneumatic converters to control the pneumatic pressure from a supply that enters said two-chamber totalizers where it is fractionally reduced prior to entering said four-chamber totalizers where it is fractionally reduced again in accordance with predetermined criteria and as governed by reference to the original pneumatic pressure, the feedback pressure, and the input from said two-chamber totalizer to maintain the necessary pressure in said bellows support members to permit said primary mirror to retain the desired position.

2. A pneumatic support system for the primary mirror of a telespectrograph comprising:
   a sine-cosine potentiometer;
   means producing an electrical output from said sine-cosine potentiometer in proportion to the elevation angle of said telespectrograph;
   said potentiometer connected with each of a sine and cosine pneumatic subsystem with feedback means therein and having an electro-pneumatic converter to which a signal from said potentiometer is conveyed;
   a source of pneumatic pressure connected with each of said converters;
   control means connected with said converters for altering the pressure therefrom and connected to said subsystems thereby insuring maintenance of a constant pneumatic pressure to support members in said system depending upon the signal conveyed to said converter;

support means in said subsystems and connected with said control means and disposed about the primary mirror for pneumatic support thereof both radially by said cosine subsystem and axially by said sine subsystem;

whereby the signals from said potentiometer are utilized to control the pneumatic pressure leaving said converter and entering said control means and where it is referenced by said feedback and control means to the total pressure provided to the system and to the pressure in said support means in order to provide accurate positioning and support of the primary mirror at a desired elevation angle.

3. The control system of claim 2 wherein said control means comprise: pneumatic fractional multipliers to provide the proper amount of pneumatic pressure to support the weight of the primary mirror.

4. The control system of claim 3 wherein said support means comprise a plurality of pressure bellows.

References Cited

UNITED STATES PATENTS

| | | | |
|---|---|---|---|
| 1,734,284 | 11/1929 | Blair | 350—85 |
| 2,736,231 | 2/1956 | Bauersfeld | 350—310 |
| 2,956,761 | 10/1960 | Weber | 242—22 |
| 3,154,627 | 10/1964 | Wallis | 350—110 |
| 3,261,016 | 7/1966 | Burr | 350—310 X |
| 3,339,293 | 9/1967 | Kuhlo et al. | 250—203 X |
| 3,121,605 | 2/1964 | Nunn. | |
| 3,063,343 | 11/1962 | Kaestner | 350—310 |

FOREIGN PATENTS 1,039,252 9/1958 Germany.

OTHER REFERENCES

"Sky and Telescope," vol. 34, No. 6, pp. 356–361, December 1967.

DAVID SCHONBERG, *Primary Examiner.*

P. R. GILLIAM, *Assistant Examiner.*